United States Patent
Von Stürmer et al.

(10) Patent No.: US 12,405,153 B2
(45) Date of Patent: Sep. 2, 2025

(54) DEVICE FOR MEASURING A CHANGE IN LENGTH

(71) Applicant: NEURA ROBOTICS GMBH, Metzingen (DE)

(72) Inventors: Philipp Von Stürmer, Hamburg (DE); Josef Siraky, Donaueschingen (DE); David Reger, Metzingen (DE); Hendrik Susemihl, Hamburg (DE); Till Staude, Hamburg (DE); Jannick Brockmann, Hamburg (DE)

(73) Assignee: NEURA ROBOTICS GMBH, Metzingen (DE)

( * ) Notice: Subject to any disclaimer, the term of this patent is extended or adjusted under 35 U.S.C. 154(b) by 527 days.

(21) Appl. No.: 17/788,171

(22) PCT Filed: Dec. 8, 2020

(86) PCT No.: PCT/EP2020/085103
§ 371 (c)(1),
(2) Date: Jun. 22, 2022

(87) PCT Pub. No.: WO2021/130014
PCT Pub. Date: Jul. 1, 2021

(65) Prior Publication Data
US 2023/0023823 A1    Jan. 26, 2023

(30) Foreign Application Priority Data
Dec. 23, 2019  (DE) .......................... 102019135732.2

(51) Int. Cl.
*G01G 21/24*    (2006.01)
*G01G 3/12*    (2006.01)
(Continued)

(52) U.S. Cl.
CPC ............. *G01G 21/244* (2013.01); *G01G 3/12* (2013.01); *G01L 1/04* (2013.01); *G01L 5/16* (2013.01)

(58) Field of Classification Search
CPC .......... G01G 21/244; G01G 3/12; G01L 1/04; G01L 5/16
(Continued)

(56) References Cited

U.S. PATENT DOCUMENTS 4,544,858 A    10/1985 Nishiguchi et al.
5,408,888 A *   4/1995 Goodier .................. G01L 1/106
                                          177/210 FP
(Continued)

FOREIGN PATENT DOCUMENTS

CN    1130756 A    9/1996
DE    3243350 A1    9/1984
(Continued)

OTHER PUBLICATIONS

German Office Action issued Oct. 1, 2020, in corresponding application No. DE 10 2019 135 732.2.
(Continued)

*Primary Examiner* — Jacques M Saint Surin
(74) *Attorney, Agent, or Firm* — Nath, Goldberg & Meyer; Jerald L. Meyer; Ilirian Durri

(57) ABSTRACT

A device for measuring a change in length has a first fastening element, a second fastening element and at least one length element which is arranged between the two fastening elements. The one length element has a first end a second end and a length along a longitudinal direction. A force acting parallel to the longitudinal direction leads to a change in length of the length element. A lever element has a first end, a second end, and a fulcrum and is arranged transversely to the longitudinal direction. The lever element
(Continued)

Figure 1:
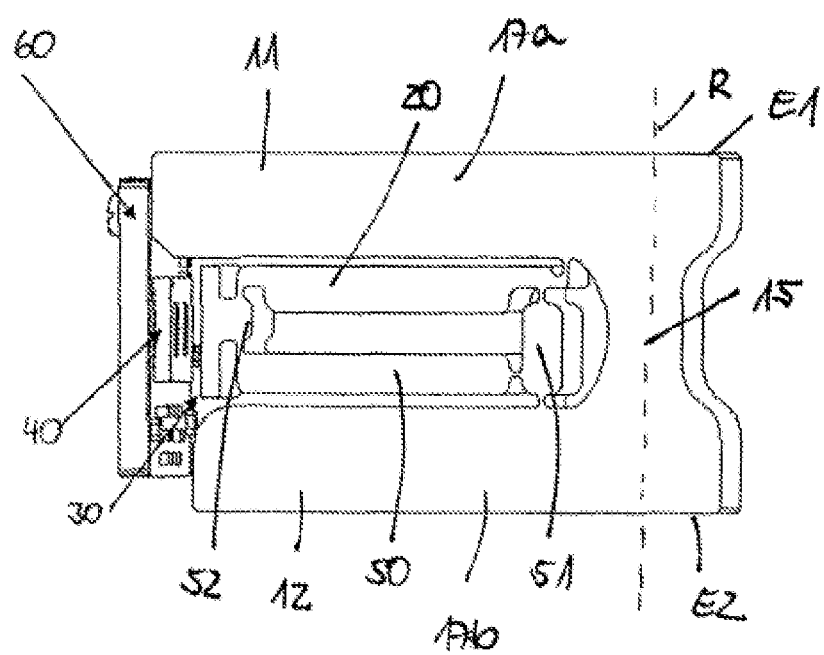

includes a first lever arm with a first length between the fulcrum and a first lever arm end and a second lever arm with a second length between the fulcrum and a second lever arm end, with the second length being greater than the first length.

11 Claims, 6 Drawing Sheets

(51) Int. Cl.
　　　*G01L 1/04* 　　　(2006.01)
　　　*G01L 5/16* 　　　(2020.01)
(58) Field of Classification Search
　　　USPC .......................................................... 177/229
　　　See application file for complete search history.

(56) References Cited

U.S. PATENT DOCUMENTS

| | | | |
|---|---|---|---|
| 5,962,818 | A | 10/1999 | Komoto et al. |
| 6,409,845 | B1 | 6/2002 | Tellenbach |
| 9,772,204 | B2 * | 9/2017 | Bauer ................ G01D 5/34707 |
| 11,262,251 | B2 * | 3/2022 | Stuker ..................... G01L 5/103 |
| 11,519,763 | B2 * | 12/2022 | Tamigniaux ........... G01B 11/02 |
| 2016/0146641 | A1 * | 5/2016 | Bauer .................. G01B 5/0014 33/706 |

FOREIGN PATENT DOCUMENTS

| | | |
|---|---|---|
| DE | 19782061 T1 | 11/1999 |
| EP | 0706035 A2 | 4/1996 |
| EP | 0945717 A1 | 9/1999 |
| JP | 8-159857 A | 6/1916 |
| JP | 7-260600 A | 10/1995 |
| JP | 2004-504592 A | 2/2004 |
| JP | 2004-205381 A | 7/2004 |

OTHER PUBLICATIONS

Office action issued Jul. 25, 2023, in parallel Japan patent application 2022-538862 with English translation.
Office Action issued Jun. 28, 2022 in parallel pending Taiwanese patent application No. 109145686 with English translation.
Office action has been issued on Oct. 7, 2023, in parallel pending Chinese patent application No. 202080089557.0.

* cited by examiner

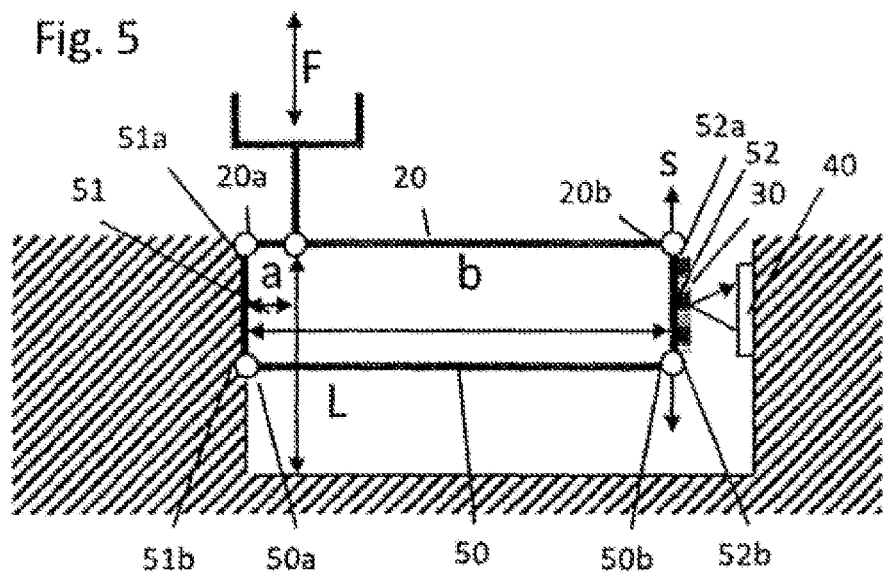

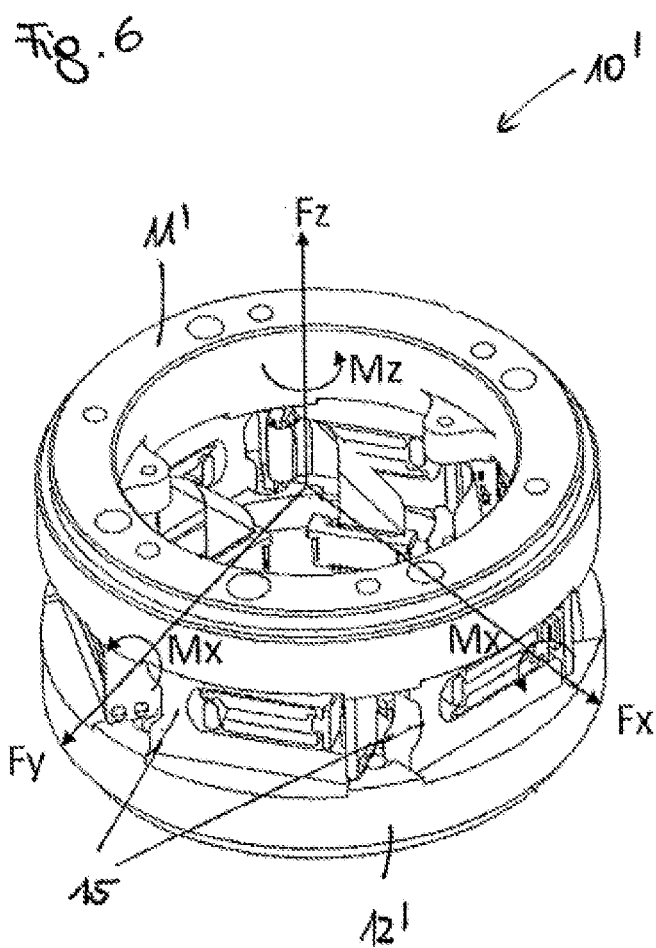

DEVICE FOR MEASURING A CHANGE IN LENGTH

This is a National Phase Application filed under 35 U.S.C. 371 as a national stage of PCT/EP2020/085103, filed Dec. 8, 2020, an application claiming the benefit of German Application No. 10 2019 135 732.2 filed Dec. 23, 2019, the content of each of which is hereby incorporated by reference in its entirety.

The invention relates to a device for measuring a change in length according to the generic term of claim 1.

In automation technology, 6-axis force torque sensors are frequently used to determine the forces and moments being exerted in all directions. For example, such sensors can be used for automatic joining or assembly of workpieces, for deburring, polishing or grinding, during haptic measurements or other areas of application. These sensors measure the forces (Fx, Fy, Fz) and moments (Mx, My, Mz) being exerted on them in and about three coordinates (x, y, z). On the one hand, such sensors should be as rigid as possible so that they themselves do not experience any deformations due to the forces or moments. On the other hand, it should be possible to achieve the highest possible resolution of the signals being measured, which as a rule is not possible with rigid sensors. In the case of known sensors, strain gauges are used to determine forces and moments, with which strain gauges very small material strains can be measured. It is, however, very complex to apply strain gauges. In addition, strain gauges require major amplification of signals, which leads to high costs of such 6-axis force torque sensors.

The task of the invention is therefore to provide a device for measuring a change in length, in particular for use in 6-axis force torque sensors, which with a high degree of rigidity can achieve a high resolution of the measured signals.

The task is solved according to the invention by a device for measuring the change in length with the features of patent claim 1.

Advantageous embodiments and further developments of the invention are indicated in the dependent claims.

The device for measuring a change in length according to the invention with a first fastening element, a second fastening element and at least one length element which is arranged between the two fastening elements and has a first end, a second end and a length along a longitudinal direction, wherein a force acting parallel to the longitudinal direction leads to a change in length of the length element, is characterized in that a lever element with a first end, a second end and a fulcrum is arranged transversely to the longitudinal direction, wherein the lever element has a first lever arm with a first length between the fulcrum and a first lever arm end and a second lever arm with a second length between the fulcrum and a second lever arm end, wherein the second length is greater than the first length, and in that the length element is pivotably arranged with its first end at the first lever arm end of the first lever arm and wherein the second lever arm end of the second lever arm is connected to a material measure, the movement of which can be detected by a scanning element.

In other words, the basic idea of the invention is to mechanically amplify the change in length by a lever element and to detect the change of path at the free end of the longer lever arm. A mechanical amplification of this type is easy and inexpensive to achieve. It can, in particular, be used for systems with a high degree of rigidity, wherein notwithstanding the rigidity, a high resolution of the change in length caused by a force or a moment can be achieved by means of the mechanical amplification.

In a preferred embodiment of the invention, the fulcrum is arranged between the first end and the second end of the lever element, and the first lever arm end of the first lever arm forms the first end of the lever element, whereas the second lever arm end of the second lever arm forms the second end of the lever element. In this way, a two-sided lever is formed.

In an alternative preferred embodiment of the invention, the fulcrum is arranged at the first end of the lever element. In this way, a one-sided lever is formed.

A preferred further development of the invention provides that a second element, which has a first end and a second end and which, by means of a first arm and a second arm which are aligned parallel to each other, is arranged parallel to the lever element, wherein the arrangement is pivotable between the second element and the first arm, between the second element and the second arm, between the lever element and the first arm, and between the lever element and the second arm. In this way, a parallelogram is formed, which parallelogram makes it possible for the material measure arranged at the second lever arm end of the second lever arm, which material measure without the second element tilts against the scanning element during a pivot movement of the lever element, to be guided aligned parallel to the longitudinal direction during a pivot movement of the lever element by the second element.

Preferably, the material measure is arranged on the second arm, wherein it preferably extends over the distance between the lever element and the second element. This enables the material measure to be aligned in any position parallel to the longitudinal direction during a pivot movement of the lever element.

Good stability of the lever arrangement can be achieved if, preferably, the first arm is arranged between the fulcrum and the first end of the second element, and the second arm is arranged between the second end of the lever element and the second end of the second element.

A particularly preferred embodiment of the invention provides that the pivotable connections are in the manner of a film hinge. Even in highly rigid materials, such pivotable connections can easily be formed by weakened material regions in such a way that on the one hand the desired high rigidity of the length element is either not or only minimally affected, whereas on the other hand the desired high resolution can be achieved by the mechanical reinforcement by the lever arrangement.

Preferably, the first fastening element is disk-like with a first plane and the second fastening element is disk-like with a second plane, wherein the first plane and the second plane are arranged parallel to each other and preferably the longitudinal direction is arranged perpendicular to the planes. The disk-like design of the fastening elements enables good fastening to the components that are to be moved relative to each other, between which the occurring forces and moments are to be measured.

The arrangement of the planes perpendicular to the longitudinal direction may simplify the determination of the forces and moments being exerted.

A particularly preferred embodiment provides that several, in particular at least six, for example precisely six, length elements are arranged between the first fastening element and the second fastening element. This enables a determination of the forces and moments being exerted between the two fastening elements in and about three axes and thus the formation as a 6-axis force torque sensor.

Advantageously, the scanning element is implemented as an optical, capacitive, inductive or magnetic scanning sensor. Optical sensors are, in particular, especially robust and enable scanning with high resolution.

Preferably, an evaluation unit is provided which evaluates the signals detected by the at least one scanning element and, in particular, calculates the forces and moments being exerted between the two fastening elements by means of the changes in length.

Figure 2:
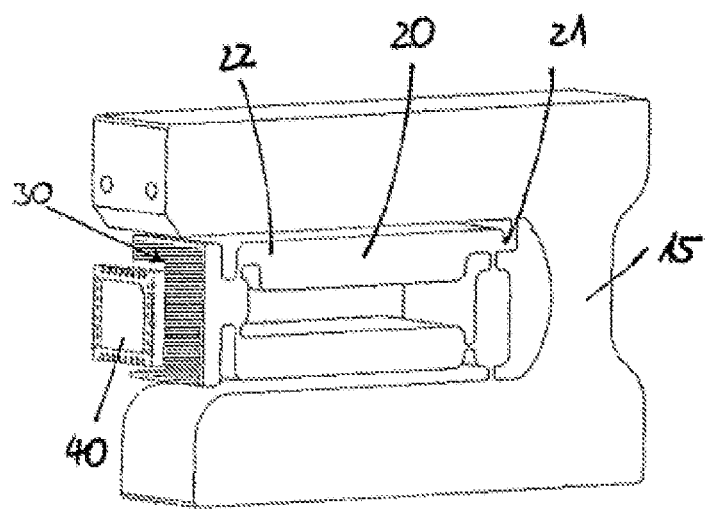
Figure 3:
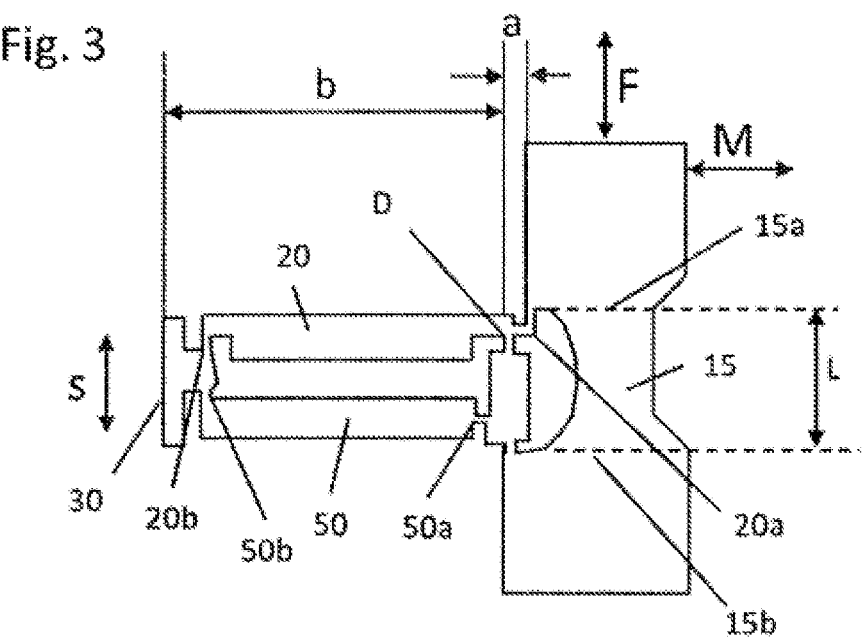
Figure 4:
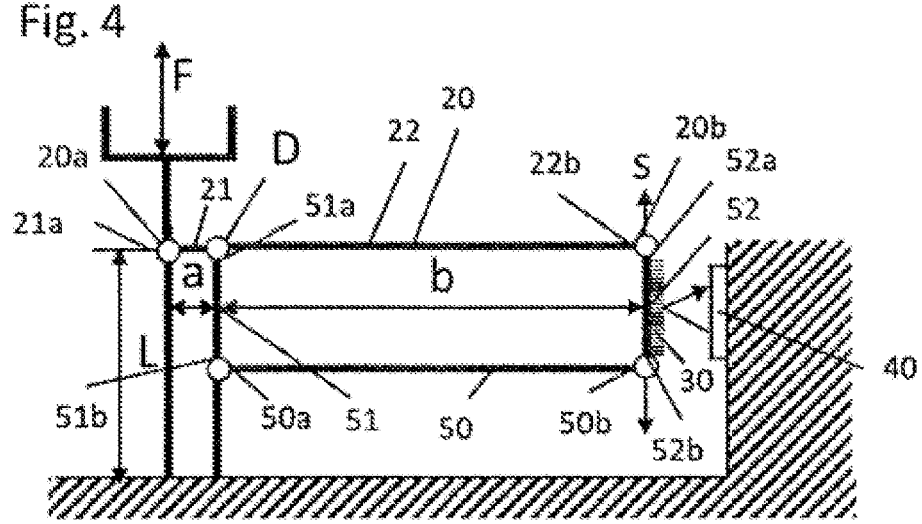

The invention is elucidated in detail making reference to the following figures. Wherein, FIG. 1 shows a perspective illustration of a first embodiment example of a device for measuring a change in length according to the invention, FIG. 2 shows a further perspective illustration of a part of the device according to FIG. 1, FIG. 3 shows a longitudinal cross-section through the device according to FIG. 2, FIG. 4 shows a schematic illustration of the lever arrangement of the device according to FIG. 1, FIG. 5 shows a schematic illustration of a lever arrangement of an alternative embodiment example of a device for measuring a change in length, and FIG. 6 shows a perspective illustration of a device for measuring a change in length with six length elements according to FIG. 1 to form a 6-axis force torque sensor.

FIGS. 1 to 4 show different views of a first embodiment example of a device 10 according to the invention for the measurement of a change in length ΔL to a length element 15, which length element has a first end 15a, a second end 15b, and a length L along a longitudinal direction R. A force F acting parallel to the longitudinal direction R leads to a change in length ΔL of the length element 15. A direct measurement of this change in length ΔL to the length element 15 is costly or can often only be detected with low resolution due to the minimal change in length ΔL. The illustrated device 10 therefore comprises a lever element 20 arranged transversely to the longitudinal direction R and having a first end 20a, a second end 20b and a fulcrum D, wherein the lever element 20 has a first lever arm 21 with a first length a between the fulcrum D and a first lever arm end 21a and a second lever arm 22 with a second length b between the fulcrum D and a second lever arm end 22b. The second length b is formed in a way to be larger than the first length a, wherein the length element 15 is pivotally arranged with its first end 15a at the first lever arm end 21a of the first lever arm 21, whereas the second lever arm end 22b of the second lever arm 22 is connected to a material measure 30. The pivotable arrangement between the length element 15 and the first lever arm end 21a of the first lever arm 21, may, in particular, be implemented in the manner of a film hinge. The film hinge may be formed, for example, by a weakened material region.

The device 10 further comprises a scanning element 40 that can detect a movement of the material measure 30.

A force F that acts on the length element 15, parallel to the longitudinal direction R and bringing about a change in length ΔL to the lever arm end 21a of the short lever arm 21 causes a change of path Δs to the second lever arm end 22b of the long lever arm 22 due to the lever element 20. In so doing, the change in length ΔL is, in particular, amplified at a ratio of b:a, the change in length Δs at the second lever arm end 22b thus amounts to Δs=b*ΔL/a.

The change of path Δs is detected by means of the scanning element 40, which scans the material measure 30 connected to the second lever arm end 22b. The material measure 30 can, in particular, be scanned optically, for which purpose, for example, the material measure 30 can be implemented to be reflective.

As illustrated in FIGS. 1 to 4, in this embodiment, the fulcrum D is arranged between the first end 20a and the second end 20b of the lever element 20, such that a two-sided lever is formed. In so doing, the first lever arm end 21a of the first lever arm 21 forms, in particular, the first end 20a of the lever element 20 and the second lever arm end 22b of the second lever arm 22 forms, in particular, the second end 20b of the lever element 20.

As illustrated in FIG. 5, it is possible that the fulcrum D is arranged at the first end 20a of the lever element 20. This forms a one-sided lever. The two lever arms 21, 22 extend from the fulcrum D in the same direction, but with respectively different lengths a or alternatively b.

The material measure 30 can be arranged on the front side of the lever element 20. The scanning element 40 is aligned in such a way that it points in the direction of the end face of the second lever arm end 22b in order to be able to scan the material measure. In this, the scanning element 40 is especially rigidly fixed, in particular parallel to the longitudinal direction R and fixedly relative to the length element 15. When the lever element 20 moves, the material measure 30 does however pivot around the fulcrum D along a circular path, which can lead to distorted measurement signals in the scanning element 40.

Therefore, irrespective of whether the lever element is implemented as a one-sided or two-sided lever, it is preferable that a second element 50 is provided, which second element has a first end 50a and a second end 50b, and which second element is arranged parallel to the lever element by means of a first arm 51, which has a first end 51a and a second end 51b, and by means of a second arm 52, which is aligned parallel to the first arm 51 and has a first end 52a and a second end 52b. The first end 51a of the first arm 51 is, in particular, connected with the fulcrum D of the lever element 20 and the second end 51b of the first arm 51 is connected with the first end 20a of the second element 50, whereas the first end 52a of the second arm 52 is connected with the second end 20b of the lever element 20 and the second end 52b of the second arm 52 is connected with the second end 50b of the second element 50. In this, the arrangements between the second element 50 and the first arm 51, the second element 50 and the second arm 52, the lever element 20 and the first arm 51, and between the lever element 20 and the second arm 52 are implemented to be pivotable, in particular, in the manner of a film hinge. The film hinge can be formed, for example, by a weakened material region.

The material measure 30 may be arranged on the second arm 52 and may preferably extend over the distance between the lever element 20 and the second element 50. This arrangement causes the material measure 30 to continue to be connected to the lever element 20, but preferably pivotally, such that when the lever element 20 moves due to a force F acting on the length element 15, the material measure 30 continues to be moved in accordance with the transmission ratio, however by means of the guidance of the second element a parallel displacement is brought about such that the material measure 30 remains in its orientation relative to the scanning element 40 as it moves.

The scanning element 40 may comprise or be connected to an evaluation unit 60, which evaluates the signals detected by the scanning element 40, and in particular calculates the force F acting on the length element 15, from the changes in lengths DI that are determined.

In order to be able to fixedly arrange the scanning element 30 relative to the length element 15, two cross members 17a, 17b are arranged on the length element 15 at the first end 15a and the second end 15b, which cross members are guided past the lever arrangement formed by the lever element and optionally the second element and the two arms 51, 52, in particular engaging around them on both sides, such that the scanning element can be arranged at the ends of the cross members 17a, 17b facing away from the length element 15.

In order to be able to determine the change in length ΔL upon exertion of a force between two components, the length element 15 is connected at its first end 15a to a first fastening element 11 and at its second end 15b to a second fastening element 12. If the first fastening element 11 is connected to a first component (not shown) and the second fastening element 12 is connected to a second component (not shown), the forces then being exerted can be determined when the two components move relative to each other. The first fastening element 11 may be formed by the first cross member 17a, the second fastening element 12 may be formed by the second cross member 17b.

FIG. 6 shows a perspective view of a device 10' for measuring a change in length ΔL, which comprises six length elements 15 according to the embodiment example shown in FIGS. 1 to 4. In this, the device 10' comprises a first fastening element 11' and a second fastening element 12', wherein the cross members 17a of the six length elements 15 are connected to the first fastening element 11' and the cross members 17b of the six length elements 15 are connected to the second fastening element 12'. The fastening elements 11', 12' are formed in a disc-like manner, for example in the manner of a disc-ring, with a first plane E1 or alternatively a second plane E2, wherein the planes E1 and E2 are arranged parallel to one another and, in particular, are arranged perpendicular to the longitudinal direction R of the length elements 15. The length elements 15 are uniformly distributed over the circumference of the fastening elements 11', 12' and, in particular, form a 6-axis force torque sensor. For this purpose, the signals detected by all six scanning elements 40 are fed to the evaluation unit 60, from which the forces Fx, Fy, Fz and moments Mx, My, Mz being exerted between the two fastening elements 11', 12' may, with appropriate calibration, be calculated.

REFERENCE LIST

10 Device
10' Device
11, 11' First fastening element
12, 12' Second fastening element
15 Length element
15a First end
15b Second end
20 Lever element
20a First end
20b Second end
21 First lever arm
21a First lever arm end
22 Second lever arm
22a Second lever arm end
30 Material measure
40 Scanning element
50 Second element
50a First end
50b Second end
51 First arm
51a First end
51b Second end
52 Second arm
52a First end
52b Second end
60 Evaluation unit
L Length
ΔL Change in length
R Longitudinal direction
F Force
M Moment
D Fulcrum
s Path
Δs Change of path
a First length
b Second length
E1 First plane
E2 Second plane

The invention claimed is:

1. Device (10, 10') for measuring a change in length (ΔL) with a first fastening element (11, 11'), a second fastening element (12, 12') and at least one length element (15) arranged between the two fastening elements (11, 11', 12, 12') with a first end (15a), a second end (15b) and a length (L) along a longitudinal direction (R), wherein a force (F) acting parallel to the longitudinal direction (R) is configured to lead to a change in length (ΔL) of the length element (15), characterized in that, transversely to the longitudinal direction (R), a lever element (20) with a first end (20a), a second end (20b) and a fulcrum (D) is arranged, wherein the lever element (20) comprises a first lever arm (21) with a first length (a) between the fulcrum (D) and a first lever arm end (21a) and a second lever arm (22) with a second length (b) between the fulcrum (D) and a second lever arm end (22b), wherein the second length (b) is larger than the first length (a), wherein the length element (15) with its first end (15a) is pivotably arranged at the first lever arm end (21a) of the first lever arm (21) and wherein the second lever arm end (22b) of the second lever arm (22) is connected to a material measure (30), the movement of which material measure (30) is detectable by a scanning element (40).

2. Device according to claim 1, characterized in that the fulcrum (D) is arranged between the first end (20a) and the second end (20b) of the lever element (20) and the first lever arm end (21a) of the first lever arm (21) forms the first end (20a) of the lever element (20) and the second lever arm end (22b) of the second lever arm (22) forms the second end (20b) of the lever element (20).

3. Device according to claim 1, characterized in that the fulcrum (D) is arranged at the first end (20a) of the lever element (20).

4. Device according to claim 1, characterized in that a second element (50) has a first end (50a) and a second end (50b) and is arranged parallel to the lever element (20) by means of a first arm (51) and a second arm (52), wherein the first arm (51) and the second arm (52) are aligned parallel to each other, wherein the second element (50) and the first arm (51) are pivotally connected to one another, wherein the second element (50) and the second arm (52) are pivotally connected to one another, wherein the lever element (20) and the first arm (51) are pivotally connected to one another, and wherein the lever element (20) and the second arm (52) are pivotally connected to one another.

5. Device according to claim 4,
characterized in that the material measure (30) is arranged on the second arm (52) and extends between the lever element (20) and the second element (50).

6. Device according to claim 4,
characterized in that the first arm (51) is arranged between the fulcrum (D) and the first end (50a) of the second element (50) and the second arm (52) is arranged between the second end (20b) of the lever element (20) and the second end (50b) of the second element (50).

7. Device according to claim 4,
characterized in that the pivotable connections between the second element (50) and the first arm (51), the second element (50) and the second arm (52), the lever element (20) and the first arm (51), and the lever element (20) and the second arm (52) are implemented in the manner of a film hinge.

8. Device according to claim 1,
characterized in that the first fastening element (11, 11') is implemented disc-shaped with a first plane (E1) and the second fastening element (12, 12') is implemented disc-shaped with a second plane (E2), wherein the first plane (E1) and the second plane (E2) are arranged parallel to each other and preferably the longitudinal direction (R) is arranged perpendicular to the planes (E1, E2).

9. Device according to claim 1,
characterized in that several, in particular six, length elements (15) are arranged between the first fastening element (11') and the second fastening element (12').

10. Device according to claim 1,
characterized in that the scanning element (40) is implemented as an optical, capacitive, inductive or magnetic scanning sensor.

11. Device according to claim 1,
characterized in that an evaluation unit (60) is provided, which evaluates the signals detected by the at least one scanning element (40), and in particular calculates the forces and moments being exerted between the two fastening elements by means of the changes in length.

* * * * *